UNITED STATES PATENT OFFICE.

HEINRICH HOCHSTÄTTER, OF LANGEN, HESSE DARMSTADT, ASSIGNOR TO WM. C. LANGE AND FERDINAND W. SENNEWALD, OF ST. LOUIS, MO.

IMPROVED COMPOSITION FOR PERCUSSION-CAPS, &c.

Specification forming part of Letters Patent No. 41,259, dated January 12, 1864.

*To all whom it may concern:*

Be it known that I, HEINRICH HOCHSTÄTTER, of the town of Langen, in the Grand Duchy of Hesse, have invented a new and Improved Explosive Composition to fill Percussion-Caps; and I do hereby declare that the following is a full and exact description of the ingredients it consists of and of the manner to compound them.

Take twelve parts of chloride of lead, eight parts of nitrate of potash, three parts gum-amber. After having the nitrate of potash and gum-amber well mixed, the chloride of lead is added and the whole made into a paste with mucilage of gum-arabic (made by dissolving one part of gum-arabic in ten parts of water) and granulated by rubbing it through a hair sieve. The mass is then carefully dried and pressed in the caps in the usual manner. The requisite quantity of the above mass for each cap, for military use, is three-fifths of a grain. After the mass has been introduced in the cap the same is coated with a varnish made of nine parts alcohol and four parts gum-shellac, or, instead thereof, covered with copper-foil, to render them water-proof.

What I claim as my invention, and desire to secure to my assignees, WM. C. LANGE and FERD. W. SENNEWALD, of St. Louis, Missouri, by Letters Patent, is—

The application of chloride of lead, compounded as described herein, as an explosive mass for the ignition of gunpowder.

HEINRICH HOCHSTÄTTER.

Witnesses:
    CARL LAUTENSCHLAGER,
    J. A. C. LEE.